(12) United States Patent
He

(10) Patent No.: US 10,332,413 B2
(45) Date of Patent: Jun. 25, 2019

(54) SYSTEM AND METHOD FOR ADJUSTING THE CORRELATION BETWEEN A VISUAL DISPLAY PERSPECTIVE AND A FLIGHT PATH OF AN AIRCRAFT

(71) Applicant: HONEYWELL INTERNATIONAL INC., Morris Plains, NJ (US)

(72) Inventor: Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 81 days.

(21) Appl. No.: 15/607,835

(22) Filed: May 30, 2017

(65) Prior Publication Data

US 2018/0350258 A1    Dec. 6, 2018

(51) Int. Cl.
| C09B 9/00 | (2006.01) |
| G01C 23/00 | (2006.01) |
| G01S 19/00 | (2010.01) |
| G01S 19/26 | (2010.01) |
| H04B 7/00 | (2006.01) |
| G09B 9/32 | (2006.01) |
| H04B 7/185 | (2006.01) |

(52) U.S. Cl.
CPC ........... *G09B 9/323* (2013.01); *G01C 23/005* (2013.01); *G01S 19/26* (2013.01); *H04B 7/18506* (2013.01)

(58) Field of Classification Search
CPC ........... G09B 9/00; G09B 9/323; G01S 19/00; G01S 19/26; H04B 7/00; H04B 7/18506; G01C 23/00
See application file for complete search history.

(56) References Cited

U.S. PATENT DOCUMENTS

| 5,289,185 A | * | 2/1994 | Ramier | G01C 23/005 340/971 |
| 5,614,897 A | | 3/1997 | Durnford | |
| 5,978,715 A | * | 11/1999 | Briffe | G05D 1/0808 244/1 R |
| 6,038,498 A | * | 3/2000 | Briffe | G01C 23/00 244/1 R |
| 6,057,786 A | * | 5/2000 | Briffe | G01C 23/00 340/974 |
| 6,112,141 A | * | 8/2000 | Briffe | G01C 23/00 345/1.3 |

(Continued)

FOREIGN PATENT DOCUMENTS

EP    2101155 A1    9/2009

OTHER PUBLICATIONS

Extended EP Search Report for Application No. 18172516.9 dated Nov. 7, 2018.

*Primary Examiner* — Yonel Beaulieu
(74) *Attorney, Agent, or Firm* — Lorenz & Kopf, LLP

(57) ABSTRACT

Methods are provided for adjusting any correlation between a visual display perspective and a default display view of an aircraft. The method comprises determining the default display view for an inflight aircraft and determining the orientation of the visual display for the crew of the aircraft. The default display view is compared with the orientation of the visual display to determine if the visual display's perspective needs to be transitioned to reflect the default display view. If the display does need to be changed, the rate of transition of the visual display's perspective is selected based on current aircraft performance parameters.

19 Claims, 4 Drawing Sheets

(56) References Cited

U.S. PATENT DOCUMENTS

| | | | |
|---|---|---|---|
| 6,486,799 B1 | 11/2002 | Still et al. | |
| 6,931,368 B1 * | 8/2005 | Seifert | G01C 23/005 434/43 |
| 6,985,091 B2 | 1/2006 | Price | |
| 7,604,595 B2 | 10/2009 | Steen et al. | |
| 8,339,284 B2 | 12/2012 | He | |
| 8,594,916 B2 | 11/2013 | He | |
| 2011/0022291 A1 | 1/2011 | He | |
| 2013/0218373 A1 | 8/2013 | Hedrick et al. | |
| 2013/0249712 A1 | 9/2013 | Buratto et al. | |
| 2016/0161278 A1 | 6/2016 | Servantie et al. | |
| 2016/0343260 A1 | 11/2016 | Branthomme et al. | |
| 2017/0068242 A1 * | 3/2017 | Liu | G06F 3/0346 |
| 2018/0233056 A1 * | 8/2018 | Liberman | G08G 5/025 |

* cited by examiner

SYSTEM AND METHOD FOR ADJUSTING THE CORRELATION BETWEEN A VISUAL DISPLAY PERSPECTIVE AND A FLIGHT PATH OF AN AIRCRAFT

TECHNICAL FIELD

The present invention generally relates to visual display systems for aircraft, and more particularly relates to a system and method for adjusting the correlation between visual display perspective and a flight path of an aircraft.

BACKGROUND

Modern aircraft contain visual display systems that provide pilots and/or flight crews with substantial amounts of important navigation, operational and situational awareness information including information about the environment and terrain outside the aircraft. In fact, multi-functional aircraft displays can provide flight crews with computer-enhanced three-dimensional perspective images of terrain especially during conditions of low visibility. These images can include three-dimensional background and terrain information as well as graphics that represent pitch reference lines, airspeed, flight path information, altitude, attitude, etc. In some implementations, the terrain imagery of the background can be high resolution, computer-generated terrain image data derived from databases and onboard vision sensor systems.

One problem with visual displays for aircraft is that the flight path of the aircraft and the perspective of the flight display may deviate significantly. This is particularly true for helicopters and other roto-aircraft. Typically, the flight display system will transition its' perspective to align with that of the true flight path of the aircraft. However, sudden changes in the displayed perspectives may lead to pilot disorientation. Hence, there is a need for a system and method for adjusting the correlation between a visual display perspective and a flight path of an aircraft.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for a method for adjusting any correlation between a visual display perspective and a default display view of an aircraft. The method comprises: determining the default display view for an inflight aircraft; determining the current orientation of the visual display for the crew of the inflight aircraft; comparing the default display view with the orientation of the visual display to determine if the visual display's perspective needs to transition to reflect the default display view; and selecting a rate of transition of the visual display's perspective that is based on current aircraft performance parameters.

An apparatus is provided for a system for adjusting any correlation between an onboard visual display perspective and a flight path of an in-flight aircraft. The apparatus comprises: a display element that provides a visual display for the crew of the in-flight aircraft; a sensor system that determines the flight path for the in-flight aircraft and current aircraft performance parameters; and a processor in operable communication with the display element and the sensor system, the processor configured to compare the flight path with the orientation of the visual display to determine if the visual display perspective needs to transition to reflect the flight path, where the processor selects a rate of transition of the visual display's perspective based on the current aircraft performance parameters.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A system and method for adjusting the correlation between the visual display perspective of an aircraft and its flight path have been developed. Embodiments of the present system and method provide for adjusting the correlation between the visual display and the flight path of an aircraft in a smooth and natural transition process. The transition is based on aircraft performance parameters and intended to avoid unexpected pilot responses or disorientation.

Figure 1:
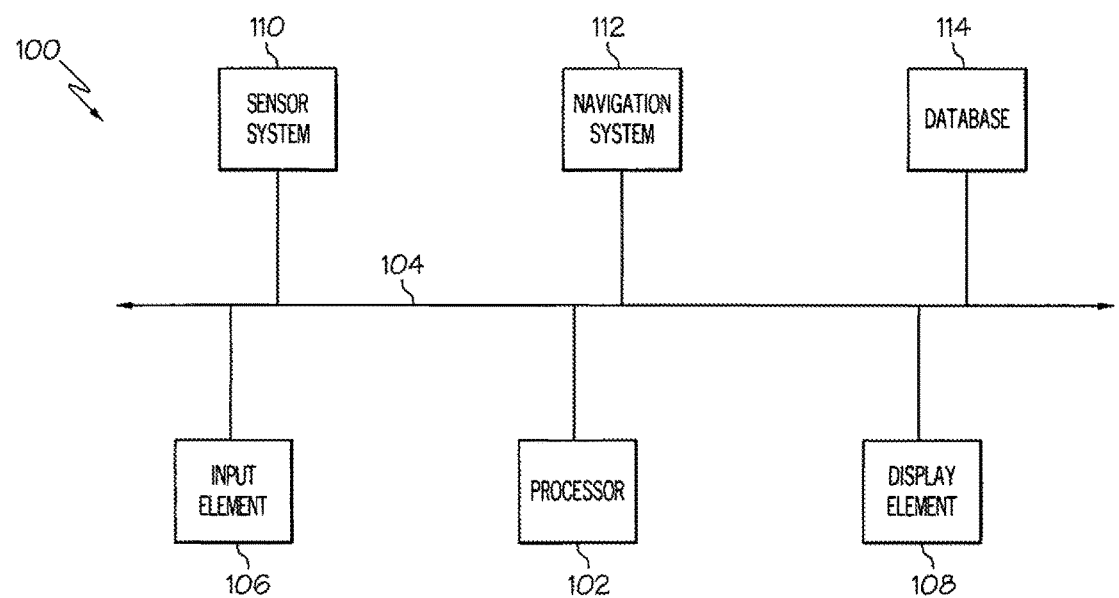
FIG. 1 depicts a block diagram of a visual display system in accordance with an exemplary embodiment.

FIG. 1 depicts a block diagram of a visual display system 100 for an aircraft, such as a helicopter or other type of aircraft, in accordance with an exemplary embodiment. The system 100 includes a processor 102, a user input element 106, a visual display element 108, a sensor system 110, a navigation system 112, and a database 114, which are coupled to one another with a high-speed data communications bus 104 or another connection scheme. The processor 102, user input element 106, display element 108, sensor system 110, navigation system 112, and database 114 can be individual components or integrated with one another, either onboard or external to the aircraft. Also, for example, system 100 can be arranged as an integrated system (e.g., aircraft display system, PFD system, etc.) or a subsystem of a more comprehensive aircraft system (e.g., Flight Management System, navigation and control system, target aiming and control system, collision alert and/or avoidance system, weather avoidance system, etc.). The various components of the system 100 will be generally described first and then followed by a more detailed explanation of their relationship to exemplary embodiments.

The processor 102 can be a computer processor such as, for example, a microprocessor, digital signal processor, or any suitable processor capable of at least receiving and/or retrieving aircraft status information, navigation and control information (e.g., from navigation system 112 and/or sensor system 110), and high resolution terrain information (e.g., from database 114 and sensor system 110), and generating suitable display control signals for the display element 108. The display control signals can be used to generate a display with, for example, aircraft status information, navigation and control information (including, for example, a zero-pitch reference line, heading indicators, tapes for airspeed and altitude, flight path information or similar type of aircraft aiming symbol, etc.), and three-dimensional terrain and other background information. As discussed in greater detail below, the processor 102 can include algorithms that can compare the current or intended flight path information to the background information at a particular perspective, and dynamically adjust the display signals such that the flight path information can be accurately displayed.

The database 114 can be a memory device (e.g., non-volatile memory, disk, drive, tape, optical storage device, mass storage device, etc.). The database 114 can include terrain and other background information stored as either absolute coordinate data or as a function of an aircraft's position. The database 114 can include, for example, the locations and elevations of natural terrain obstacles such as mountains or other elevated ground areas; the locations and elevations of man-made obstacles such as radio antenna towers, buildings, bridges, etc.; boundaries and elevations of restricted airspace; and navigation data such as localized targets, runways, navigational waypoints, and position beacons.

The sensor system 110 can include one or more visual sensors and other types of sensors that provide information for the database 114 and/or processor 102. The information provided by the sensor system 110 can include navigation and control information, as well as background and terrain information.

The navigation system 112 can provide navigation data associated with the aircraft's current status, position and flight direction (e.g., heading, course, track, attitude, and any flight path information.) to the processor 102. The navigation system 112 can form part of a larger flight management system and can include, for example, an inertial navigation system, and a satellite navigation system (e.g., Global Positioning System). For one exemplary embodiment, the navigation system 112 can include suitable position and direction determination devices that can provide the processor 102 with at least an aircraft's current position (e.g., in latitudinal and longitudinal form), the real-time direction (e.g., heading, course, track, etc.) of the aircraft in its flight path, and other important flight information (e.g., pitch, airspeed, altitude, attitude, etc.).

The display element 108 may include any device or apparatus suitable for displaying various types of computer-generated symbols and information representing, for example, natural and man-made terrain and other background information, pitch, heading, flight path, airspeed, altitude, attitude, target data, flight path marker data, and any type of flight path information in an integrated, multi-color or monochrome form (e.g., flat-panel color display). Although a cockpit display screen may be used to display the above-described flight information and terrain symbols and data, exemplary embodiments discussed herein are not intended to be so limited and can include any suitable type of display medium capable of visually presenting multi-colored or monochrome flight information and terrain symbols and data for a pilot or other flight crew member, and in particular, but not exclusively, on a continuous, three-dimensional perspective view aircraft display. As such, many known display monitors are suitable for displaying such information, symbols and data, such as, for example, various CRT and flat-panel display systems (e.g., CRT displays, LCDs, OLED displays, plasma displays, projection displays, HDDs, Heads-Up Displays/HUDs, etc.).

The user input element 106 includes, but is not limited to, keyboards, pointer devices, touch screens, microphones, etc. In some embodiments, the user input element 106 includes more than one type of input element. In other embodiments, the system 100 does not include any user input element 106, and/or the user input element 106 is only used to override automated functions of the system 100.

Figure 2:
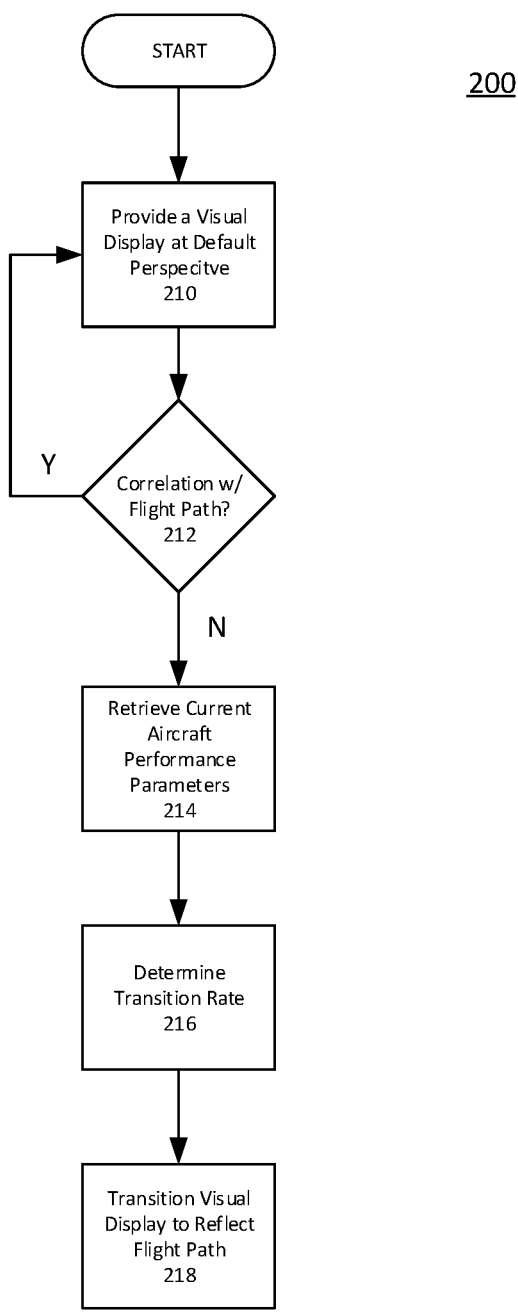
FIG. 2 depicts a flow chart showing the method for adjusting the correlation between a visual display perspective and a flight path of an aircraft in accordance with an exemplary embodiment.

FIG. 2, with continued reference to FIG. 1, depicts a flow chart showing the method for adjusting the correlation between a visual display perspective and a flight path of an aircraft 200 in accordance with one embodiment. The visual display of the aircraft initially provides a display at a default perspective 210. The default perspective depends on the emphasis of the current task in the phase of flight of the aircraft. For example, the default view may be the current flight path orientation, the current heading orientation, etc. If the trajectory of the aircraft is more important at the current phase of flight than the current heading, the display of the trajectory will take precedence. For example, as an aircraft begins an approach for a landing, the display will center on the landing target. Conversely, if the current phase of flight demands heading as the more important measure (e.g., slow hovering of a helicopter), the display will center on the current heading of the aircraft.

The system on board the aircraft 100 will determine the flight path, heading, attitude, etc. of the aircraft, the orientation of the visual display optimal for current phase of flight, and compare and determine if the two adequately correlate 212. In the example of an aircraft flying along a path at certain speed, the direction of travel is of primary importance. If sufficient correlation exists between the flight path in the visual display, the system will maintain the default perspective along the path. However, if the flight path and the default visual display differ significantly, the system will begin a transition of the visual display to reflect the flight path of the aircraft. In examples of a helicopter slowing down to hover operations, the optimal visual perspective or default perspective for the hover operations is the current heading orientation. As such, when visual perspective and default perspective differs significantly, the system will begin a transition of the visual display to the heading orientation.

If a transition is required, the current aircraft performance parameters are retrieved 214 by the sensor system 110, the navigation system 112 and the database 114. The aircraft performance parameters may include: the heading change rate of the aircraft (i.e., rate of turn); the lateral acceleration of the aircraft; the vertical acceleration of the aircraft; the yaw rate of the aircraft; the ground speed of the aircraft; etc. The performance parameters are collected by software module on board the aircraft and provided to the processor 102 of the system 100. The processor 102 determines the transition rate of the visual display to reflect the default view orientation such as flight path 216 or heading based on the performance parameters and transitions the visual display to reflect the flight path 218 or heading.

The transition rate is measured in degrees per second in some embodiments. The transition rate may vary widely. For example, a transition rate of 1° per second is considered very slow while a transition rate of 20° per second is considered very fast. In some embodiments, the transition rate may be in the range from 5°-15° per second with a default rate of 10° per second. In other embodiments, the transition rate for a transition event needs not to be a fixed value.

Achieving a smooth and natural transition between the display view and the aircraft heading is based on using the aircraft dynamics as the primary driving source for the transition rate. For example, if the aircraft parameter change rates or accelerations are small, the display view transition will happen slowly over a longer period. Conversely, a large changing rate of the parameters typically results in a quicker change of display perspectives. The overall goal is avoiding pilot confusion and disorientation. In other embodiments, a pilot of the aircraft may manually select the transition rate based on personal preference.

Figure 3:
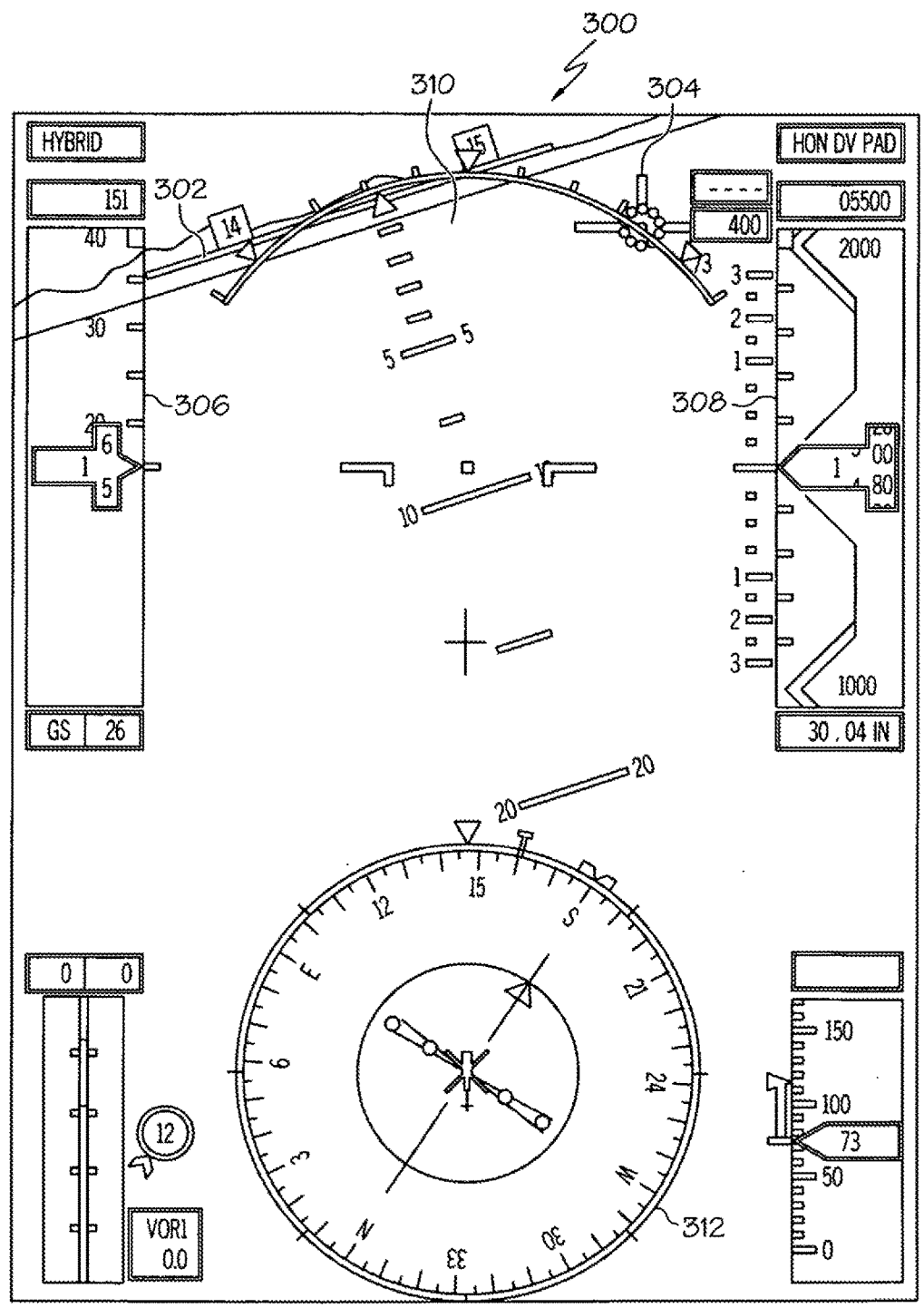
FIG. 3 depicts a visual display for helicopter in accordance with an exemplary embodiment.

FIG. 3, with continued reference to FIGS. 1 and 2, depicts a visual display for helicopter in accordance with an exemplary embodiment. If the flight path information can be accurately displayed at the default perspective 212, the method 200 will continue displaying at the default perspective 210. The method 200 will also continue to receive the flight path information and continue to evaluate the flight path information within the default perspective on an ongoing basis.

However, the example depicted by FIG. 3 shows the helicopter is taking off and the actual flight path is almost straight up. As such, the flight path information is at too great an angle to be represented accurately on the limited dimensions of the display. In FIG. 3, the flight path information is represented by marker 304, which is not an accurate representation of the true flight path relative to the background 310. The flight path marker 304 provides a general guidance, but it is not accurate as indicated to the pilot by its dashed/ghosted nature. This discrepancy can potentially cause confusion for the pilot, and at the very least, fails to provide useful flight path information.

Figure 4:
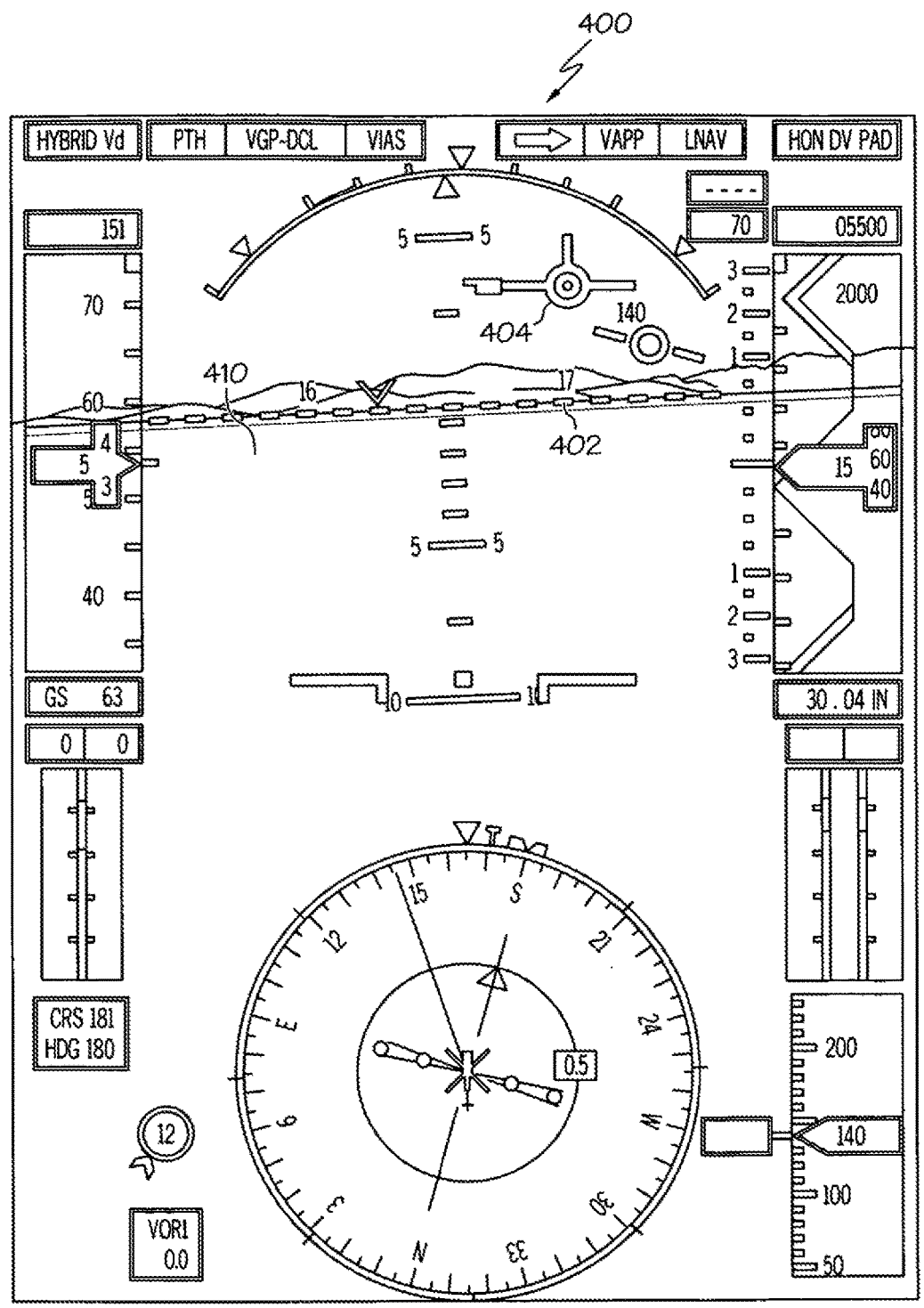
FIG. 4 depicts a visual display for helicopter that has been adjusted relative to the display shown in FIG. 3 in accordance with an exemplary embodiment.

If confronted with a situation shown in FIG. 3, the method 200 will proceed to retrieve current aircraft performance parameters 214, determine a transition rate 216, and transition the visual display to reflect the flight path 218. A transitioned display 400 is shown in FIG. 4 with continued reference to FIG. 3. As a result of the transition, the background 410 has been shifted up and to the right. A marker 404 accurately indicates the flight path information relative to the displayed background 410. The transition from the default display 300 of FIG. 3 to the adjusted display 400 of FIG. 4 is smooth and natural so as not to disorient the pilot. Although the examples shown in FIGS. 3 and 4 use the vertical component of the flight path to indicate the transition process controlled by using aircraft dynamic parameters, it should be understood that such a controlled transition can be applied to the lateral direction component of the flight path (ground track), when the default view is transitioned from heading to or from current ground track directions.

In determining the transition rate, the system 100 generally considers the angle and direction of the flight path information and ensures that the flight path marker 404 can be displayed relative to the background 410 within the viewing area of the display. The system 100 shifts the perspective in one or more of the horizontal and/or vertical directions to accommodate the angle and direction. This provides the flight crew with an accurate representation of the actual flight path information relative to the background 410. In an intuitive sense, this adjustment represents the action of a pilot turning his or her head to get a better view of the intended flight direction out of a window of a helicopter. The display mimics this perspective with the three-dimensional background 410 and the flight path information. The adjusted perspective can be indicated by the dashed nature of a zero-pitch reference line 402 or size, position, and color change of the aircraft symbol on the display. Certain textual annunciations or indications may also be provided. In other embodiments, the display can be adjusted by increasing or decreasing the scaling of the perspective. In other words, the system 100 can "zoom out" such that the flight path information can be accurately displayed relative to the background 410. In an alternate embodiment, the perspective can be adjusted manually by the flight crew with the user input element 106.

As noted above, the method 200 can be particularly useful for displaying accurate flight path information during certain phases of flight, such as for example, take-off and landing. The flight path information can include current or intended flight path information and/or can include user-selected flight path information. It should also be understood that exemplary methods may include additional or fewer steps or may be performed in the context of a larger processing scheme. Furthermore, it will be understood by one of skill in the art that although the specific embodiments illustrated below are directed at helicopters, the methods and system may be used in various embodiments employing various types of displays, such as displays in space craft, aircraft, rotorcraft, and unmanned air vehicles (UAV). Moreover, embodiments of the present invention are suitable for use on CRT, LCD, plasma displays or any other existing display technology.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for adjusting any correlation between an onboard visual display perspective and a default display view of an inflight aircraft, comprising:
    determining the default display view of the visual display for the inflight aircraft;
    determining the current orientation of the visual display for the crew of the inflight aircraft;
    comparing the default display view of the visual display with the current orientation of the visual display to determine if the current visual display perspective needs to transition to reflect the default display view of the visual display; and
    selecting a rate of transition of the current visual display's perspective that is based on current aircraft performance parameters.

2. The method of claim 1, where the default display view is the current flight path.

3. The method of claim 1, where the default display view is the current heading orientation.

4. The method of claim 1, where the current aircraft performance parameters are detected by an onboard software module.

5. The method of claim 1, where the current aircraft performance parameters comprise a heading change rate of the aircraft.

6. The method of claim 1, where the current aircraft performance parameters comprise lateral acceleration of the aircraft.

7. The method of claim 1, where the current aircraft performance parameters comprise vertical acceleration of the aircraft.

8. The method of claim 1, where the current aircraft performance parameters comprise yaw rate of the aircraft.

9. The method of claim 1, where the current aircraft performance parameters comprise ground speed of the aircraft.

10. The method of claim 1, where the rate of transition is from 1°-20° per second.

11. The method of claim 1, where the rate of transition is from 5°-15° per second.

12. The method of claim 1, where the rate of transition is approximately 10° per second.

13. The method of claim 1, where the rate of transition is manually selected by a pilot of the aircraft.

14. The method of claim 1, where the aircraft is a rotor wing aircraft.

15. The method of claim 14, where the rotor wing aircraft is a helicopter.

16. The method of claim 1, where the aircraft is an unmanned aerial vehicle (UAV).

17. The method of claim 1, where the aircraft is a spacecraft.

18. A system for adjusting any correlation between an onboard visual display perspective and a flight path of an in-flight aircraft, comprising:
    a display element that provides a visual display for the crew of the in-flight aircraft;
    a sensor system that determines the flight path for the in-flight aircraft and current aircraft performance parameters; and
    a processor in operable communication with the display element and the sensor system, the processor configured to compare the flight path with the current orientation of the visual display to determine if the current visual display perspective needs to transition to reflect the flight path, where the processor selects a rate of transition of the current visual display's perspective based on the current aircraft performance parameters.

19. The system of claim 18, where the display element is a heads-up display (HUD).

* * * * *